March 19, 1935.   L. S MADDA   1,994,525
PAIL
Filed Feb. 15, 1934
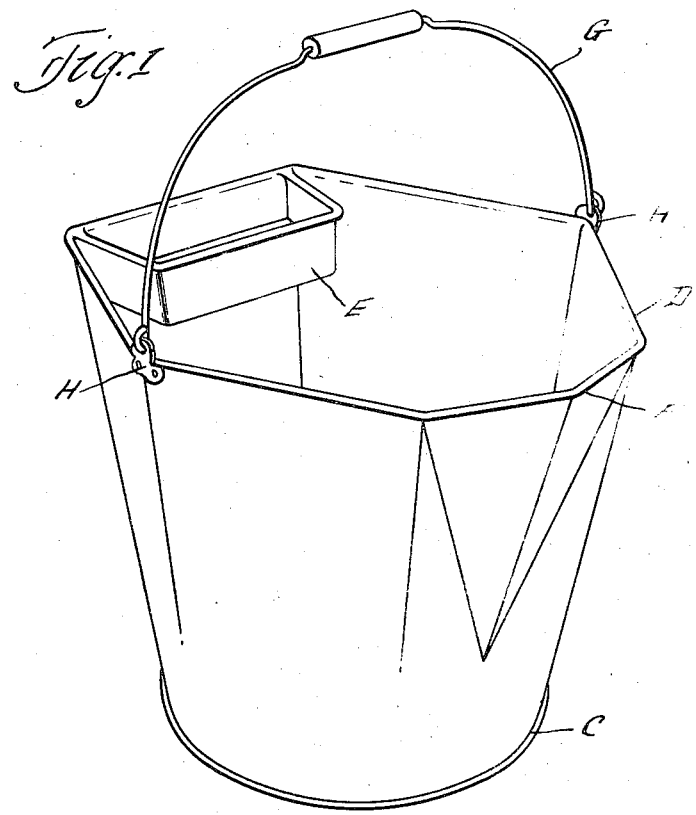
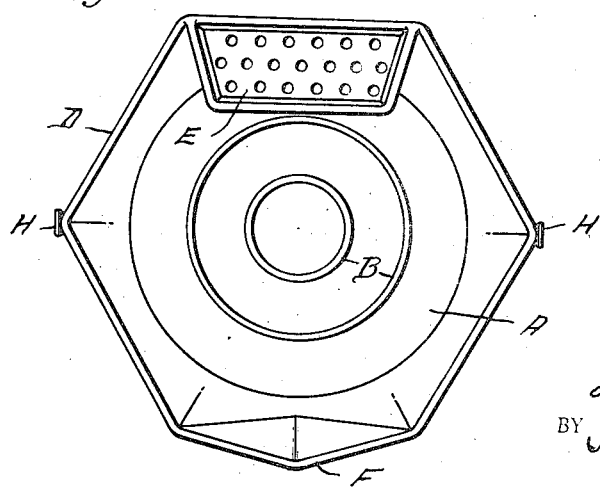
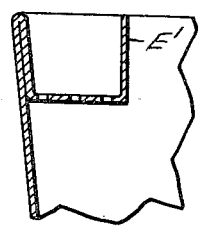
INVENTOR.
L. S. Madda
BY Hull, Broch & West
ATTORNEY.

Patented Mar. 19, 1935

1,994,525

UNITED STATES PATENT OFFICE 1,994,525

PAIL

Lauretta S. Madda, Cleveland, Ohio

Application February 15, 1934, Serial No. 711,328

3 Claims. (Cl. 220—20)

This invention relates to a receptacle or pail which is used in many household operations, as in washing windows, floors, or for professional cleaning services.

The main object of the invention is to provide a pail of the character described which is preferably formed of metal and which is well adapted for production at comparatively low cost.

Another object of the invention is to provide a metal pail for the purpose described which preferably has a circular bottom portion and a top portion which is polygonal in shape and which carries at one side thereof a container or receptacle which will conveniently receive soap or other cleaning material, the wall of the pail opposite the receptacle being shaped to provide a spout.

Further and more limited objects of the invention will appear as the description proceeds and by reference to the accompanying drawing in which Fig. 1 is a perspective view of my improved pail; Fig. 2 a top plan view thereof and Fig. 3 a fragmentary sectional view disclosing a slight modification.

Referring now to the drawing, the preferred form of pail consists essentially of a bottom A which is formed of metal and is preferably circular in shape and provided with a plurality of circular grooves or depressions B which serve to strengthen and to add rigidity to the bottom. The peripheral edge of the bottom is provided with an outwardly disposed bead or projection C. The side wall of the container is preferably formed from a single piece of metal, the bottom portion of which is circular in shape and fits within the bead C. This side wall is secured to the bottom in any suitable manner as by being soldered or welded. The upper portion of the side wall of the container is preferably hexagonal in shape and converges downwardly as shown. Extending about the upper peripheral edge of the side wall of the container is a bead D which serves to strengthen the construction. Disposed at one side of the container and inwardly thereof and carried by the side wall is a metal container or receptacle E which has a perforated bottom and which is shaped as shown most clearly in Figs. 1 and 2 and which is substantially coextensive with the adjacent side. This receptacle E may be soldered to the side wall or secured thereto by any suitable means. The side of the container opposite the receptacle E is shaped to provide a spout or pouring lip F by projecting outwardly the central portion of said side.

Secured to the container and preferably disposed at right angles to the receptacle E and spout F is a bail G by means of which the pail may be conveniently carried. The hexagonal shape of the upper portion of the pail does not extend the entire depth thereof but merges with the frusto conical portion of the bottom, as shown.

The particular shape of the side wall of the pail tends to strengthen the entire construction and at the same time enables me to make use of a thinner gauge metal and still have substantially the same strength. Another advantage of forming the upper portion of the pail hexagonal in shape is to enable the ears H for the bail to be secured at opposed angles formed by the sides whereby the pail will be balanced and at the same time allow for shaping the side wall opposite the receptacle to provide a spout or pouring lip. The hexagonal shape of the upper portion of the pail gives more room and provides easy access to the pail.

In Fig. 3 there is disclosed a slightly modified form of pail in which the receptacle E is formed integral with the side wall. In this form of the invention, one side wall of the pail is provided with an integral extension which is folded over inwardly and bent to the shape shown in Fig. 3. In other respects, this form of pail is identical with that shown in Figs. 1 and 2.

Reference has been made hereinbefore to the fact that the upper portion of the pail is made hexagonal in shape. In addition to enabling the ears H to be secured at opposed angles, and to enabling the pail to be balanced, this shape and construction of pail strengthens the parts to which the ears are attached against collapsing by virtue of the outwardly extending angles at opposed sides. It enables me to use comparatively light material for the pail without the necessity for a rib or brace extending between the parts to which the bail is attached.

It will now be clear that I have provided a pail of the characters described which will accomplish the objects of the invention as hereinbefore stated. It is of course understood that various changes may be made in the details of construction without departing from the spirit of my invention and that the embodiment of the invention herein disclosed is merely illustrative and is not to be considered in a limiting sense as the invention is limited only in accordance with the scope of the appended claims.

Having thus described my invention, what I claim is:

1. A sheet metal pail having a substantially equilateral hexagonal shape at the top and a round bottom portion, a bail connected at two opposite corners of the top, and a soap dish made by bending inwardly an extension of one of the sides midway of the corners to which the bail is attached.

2. A sheet metal pail having a substantially equilateral hexagonal shape at its upper part and a circular lower part, the hexagonal portion merging into the circular portion at a substantial distance below the top of the pail, a bail connected at two opposite corners of the top, and a soap dish located interiorly of one of the sides midway between the corners to which the bail is attached.

3. A sheet metal pail as in claim 2, and a pouring spout formed by bending the top of the side of the pail opposite the soap dish.

LAURETTA S. MADDA.